(12) United States Patent
Oh (10) Patent No.: US 11,254,239 B2
(45) Date of Patent: Feb. 22, 2022

(54) VEHICLE POWER CONTROLLER, SYSTEM INCLUDING THE SAME, AND METHOD THEREOF FOR SMART KEY AUTHENTICATION

(71) Applicants: Hyundai Motor Company, Seoul (KR); Kia Motors Corporation, Seoul (KR)

(72) Inventor: Da Ye Oh, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 32 days.

(21) Appl. No.: 16/794,992

(22) Filed: Feb. 19, 2020

(65) Prior Publication Data

US 2021/0070194 A1  Mar. 11, 2021

(30) Foreign Application Priority Data

Sep. 6, 2019 (KR) .......................... 10-2019-0110982

(51) Int. Cl.
*G08B 21/00* (2006.01)
*B60N 2/00* (2006.01)
*E05B 39/00* (2006.01)
*E05B 77/14* (2014.01)

(52) U.S. Cl.
CPC .............. *B60N 2/002* (2013.01); *E05B 39/00* (2013.01); *E05B 77/14* (2013.01)

(58) Field of Classification Search
CPC ......... B60N 2/002; E05B 39/00; E05B 77/14; B60R 16/03; B60R 25/31; B60R 25/34; B60R 25/08; B60R 25/1001; B60R 25/245; B60Y 2400/90
USPC .......................................................... 701/36
See application file for complete search history.

(56) References Cited

U.S. PATENT DOCUMENTS

| | | | | |
|---|---|---|---|---|
| 5,808,372 A | * | 9/1998 | Schwegler | B60R 25/04 307/10.4 |
| 2004/0212252 A1 | * | 10/2004 | Ohtaki | B60R 25/2063 307/10.3 |
| 2005/0020212 A1 | * | 1/2005 | Hiramitsu | B60R 25/245 455/41.2 |
| 2007/0261653 A1 | * | 11/2007 | Yagyu | B60R 25/045 123/179.2 |
| 2013/0332009 A1 | * | 12/2013 | Aragai | B60R 25/20 701/2 |
| 2017/0096958 A1 | * | 4/2017 | Jiang | F02D 41/221 |
| 2017/0259783 A1 | * | 9/2017 | Hanson | B60R 16/02 |

* cited by examiner

*Primary Examiner* — Mark S Rushing
(74) *Attorney, Agent, or Firm* — Mintz Levin Cohn Ferris Glovsky and Popeo, P.C.; Peter F. Corless (57) ABSTRACT

A vehicle power controller includes a processor capable of switching a power source of a vehicle based on whether a user rides in the vehicle, or whether a brake input occurs. The processor determines whether the user rides in the vehicle based on whether a smart key is authenticated in an interior of the vehicle, whether a door of the vehicle is opened or closed, or whether the user is seated in a seat.

17 Claims, 6 Drawing Sheets

VEHICLE POWER CONTROLLER, SYSTEM INCLUDING THE SAME, AND METHOD THEREOF FOR SMART KEY AUTHENTICATION

CROSS-REFERENCE TO RELATED APPLICATION

This application is claims under 35 U.S.C. § 119(a) the benefit of Korean Patent Application No. 10-2019-0110982, filed in the Korean Intellectual Property Office on Sep. 6, 2019, the entire contents of which are incorporated herein by reference.

BACKGROUND

(a) Technical Field

The present disclosure relates to a vehicle power controller, a system including the same, and a method thereof, more particularly, relates to the vehicle power controller, system, and method capable of switching a power source of a vehicle without a start button.

(b) Description of the Related Art

In general, a smart key system of a vehicle enables a user to unlock a door of the vehicle and start an engine of the vehicle without using a physical key or a remote controller button.

After a low frequency (LF) antenna of the vehicle is driven, the smart key system transmits an LF signal to an authentication key (a fob key). After receiving the LF signal, the authentication key (the fob key) automatically transmits a radio frequency (RF) signal. A smart key module authenticates the authentication key through an RF antenna, and unlocks a door of the vehicle or switches a power source of the vehicle to start the engine.

Typical power sources of a vehicle include BATT, IGN1, IGN2, ACC, and START. Attributes of these power sources are determined by an ignition key switch of ignition key specifications or a start button switch of start button specifications. In other words, a conventional smart key system may determine start button and brake input commands and may control to switch a power state.

SUMMARY

An aspect of the present disclosure provides a vehicle power controller for switching a power source of a vehicle based on whether a user rides in the vehicle, or whether a brake input occurs.

According to an aspect of the present disclosure, a vehicle power controller may include: a processor that switches the power source of the vehicle based on (one or more of) whether a user rides in the vehicle, or whether a brake input occurs; and a storage storing information for authenticating the smart key in the interior of the vehicle. The processor may determine whether the user rides in the vehicle based on (one or more of) whether a smart key is authenticated in the interior of the vehicle, whether a door of the vehicle is opened or closed, or whether the user is seated in the seat.

In an embodiment, the processor may switch from a power-off stage of the vehicle to a power-on stage of the vehicle, when a door adjacent to the driver's seat is opened and when the smart key succeeds in being authenticated in the interior of the vehicle, or when all the doors are closed after a door except for the door adjacent to the driver's seat is opened and when the smart key succeeds in being authenticated in the interior of the vehicle, in a power-off stage of the vehicle.

In an embodiment, the processor may determine whether the state where the smart key is authenticated in the interior of the vehicle is maintained during a predetermined time, in the power-on stage of the vehicle.

In an embodiment, the processor may switch the power source of the vehicle from the power-on stage of the vehicle to a drivable stage of the vehicle, when the stage where the smart key is authenticated in the interior of the vehicle is maintained during the predetermined time in the power-on stage of the vehicle and when a brake input occurs.

In an embodiment, the processor may reattempt to authenticate the smart key in the interior of the vehicle, when a predetermined time elapses after the smart key succeeds in being authenticated in the interior of the vehicle in the power-on stage of the vehicle and when a brake input occurs.

In an embodiment, the processor may switch the power source of the vehicle from the power-on stage of the vehicle to a drivable stage of the vehicle, when the authentication succeeds as a result of reattempting to authenticate the smart key in the interior of the vehicle.

In an embodiment, the processor may output a warning according to an attempt to start the vehicle without the smart key, when the authentication fails as a result of reattempting to authenticate the smart key in the interior of the vehicle.

In an embodiment, the processor may switch from the power-off stage of the vehicle to an accessory (ACC) stage, when a door adjacent to the driver's seat is opened and when the smart key is authenticated in the interior of the vehicle, or when all the doors are closed after a door except for the door adjacent to the driver's seat is opened and the smart key is authenticated in the interior of the vehicle, in a power-off stage of the vehicle.

In an embodiment, the processor may determine whether the user is seated in the driver's seat in the ACC stage and may switch from the ACC stage to an ignition (IGN) stage when the user is seated in the driver's seat.

In an embodiment, the processor may switch the power source of the vehicle from the IGN stage to a drivable stage of the vehicle, when the state where the smart key is authenticated in the interior of the vehicle is maintained during a predetermined time and when a brake input occurs, in the IGN stage.

According to another aspect of the present disclosure, a vehicle system may include: a smart key that communicates with a vehicle and a vehicle power controller that communicates with the smart key and switches the power source of the vehicle based on (one or more of) whether a user rides in the vehicle, or whether a brake input occurs. The vehicle power controller may determine whether the user rides in the vehicle based on (one or more of) whether a smart key is authenticated in the interior of the vehicle, whether a door of the vehicle is opened or closed, or whether the user is seated in the seat.

In an embodiment, the vehicle system may further include a door switch that is turned on or off according to whether a door of the vehicle is opened or closed and a seat sensor that senses that the user is seated in the seat of the vehicle.

According to another aspect of the present disclosure, a vehicle power control method may include: determining whether a user rides in a vehicle based on whether a door of the vehicle is opened or closed or whether the user is seated in the seat, authenticating a smart key which exists in the interior of the vehicle, and switching a power source of the vehicle based on (one or more of) whether the user rides in the vehicle, or whether a brake input occurs.

In an embodiment, determining whether the user rides in the vehicle may include determining that the user rides in the vehicle, when a door adjacent to the driver's seat is opened and when the smart key succeeds in being authenticated in the interior of the vehicle, or when all the doors are closed after a door except for the door adjacent to the driver's seat is opened and when the smart key succeeds in being authenticated in the interior of the vehicle, in a power-off stage of the vehicle.

In an embodiment, switching the power source of the vehicle may include switching from the power-off stage of the vehicle to a power-on stage of the vehicle, when it is determined that the user rides in the vehicle.

In an embodiment, switching the power source of the vehicle may include determining whether the state where the smart key is authenticated in the interior of the vehicle is maintained during a predetermined time, in the power-on stage of the vehicle.

In an embodiment, switching the power source of the vehicle may further include switching the power source of the vehicle from the power-on stage of the vehicle to a drivable stage of the vehicle, when the state where the smart key is authenticated in the interior of the vehicle is maintained during the predetermined time in the power-on stage of the vehicle and when a brake input occurs.

In an embodiment, switching the power source of the vehicle may further include reattempting to authenticate the smart key in the interior of the vehicle, when a predetermined time elapses after the smart key succeeds in being authenticated in the interior of the vehicle in the power-on stage of the vehicle and when a brake input occurs and switching the power source of the vehicle from the power-on stage of the vehicle to a drivable stage of the vehicle, when the authentication succeeds as a result of reattempting to authenticate the smart key in the interior of the vehicle.

In an embodiment, switching the power source of the vehicle may further include outputting a warning according to an attempt to start the vehicle without the smart key, when the authentication fails as a result of reattempting to authenticate the smart key in the interior of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure discloses a configuration capable of determining whether a user rides in a vehicle using at least one or more of and/or whether a smart key is authenticated in the interior of the vehicle, or whether a door of the vehicle is opened without having a vehicle start button and automatically switching a power source of the vehicle using at least one or more of the result of determining whether the user rides in the vehicle, or whether a brake input occurs, (whether there is success in authenticating the smart key as the smart key exists in the interior of the vehicle and is an authorized smart key of the user).

Hereinafter, a description will be given in detail of embodiments of the present disclosure with reference to FIGS. 1 and 6.

Figure 1:
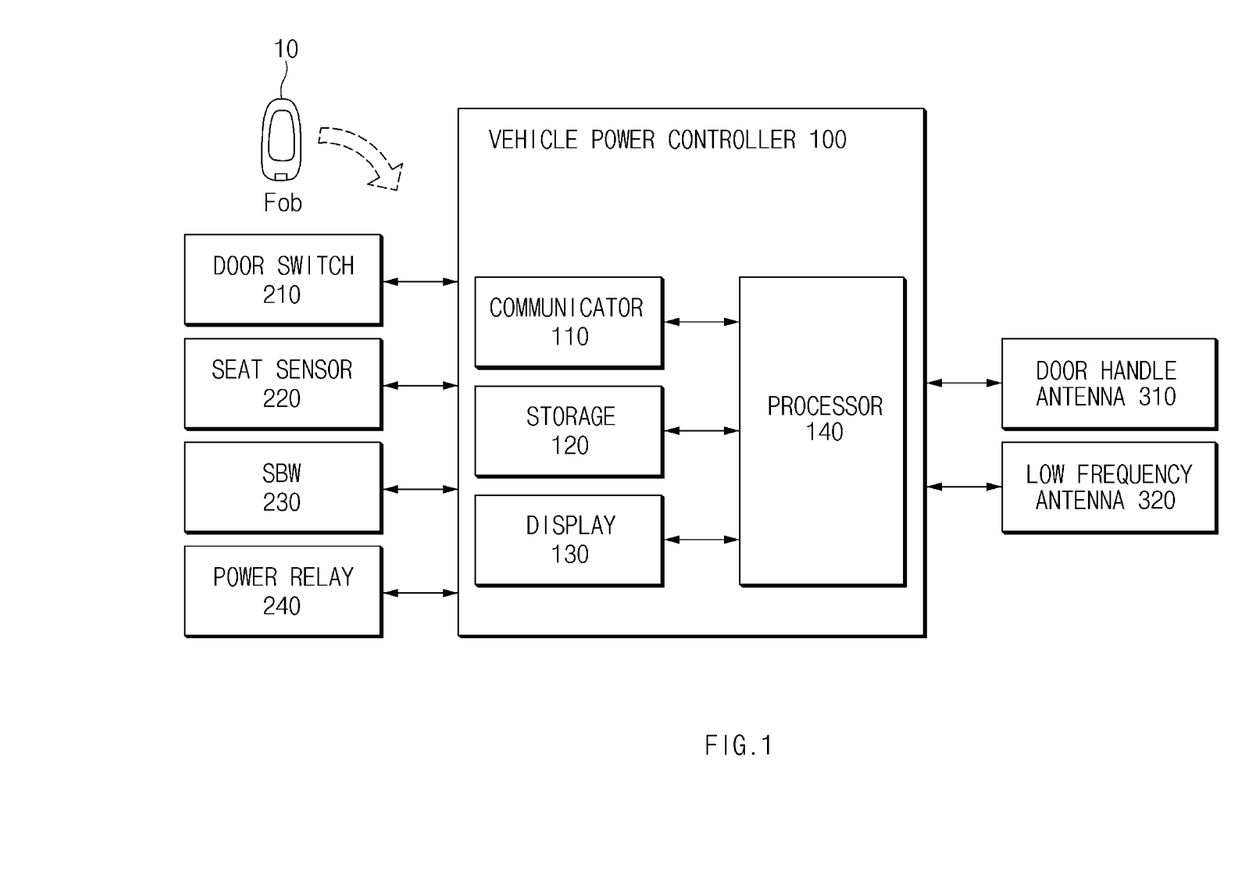
FIG. 1 is a block diagram illustrating a configuration of a vehicle system including a vehicle power controller according to an embodiment of the present disclosure.
Figure 2:
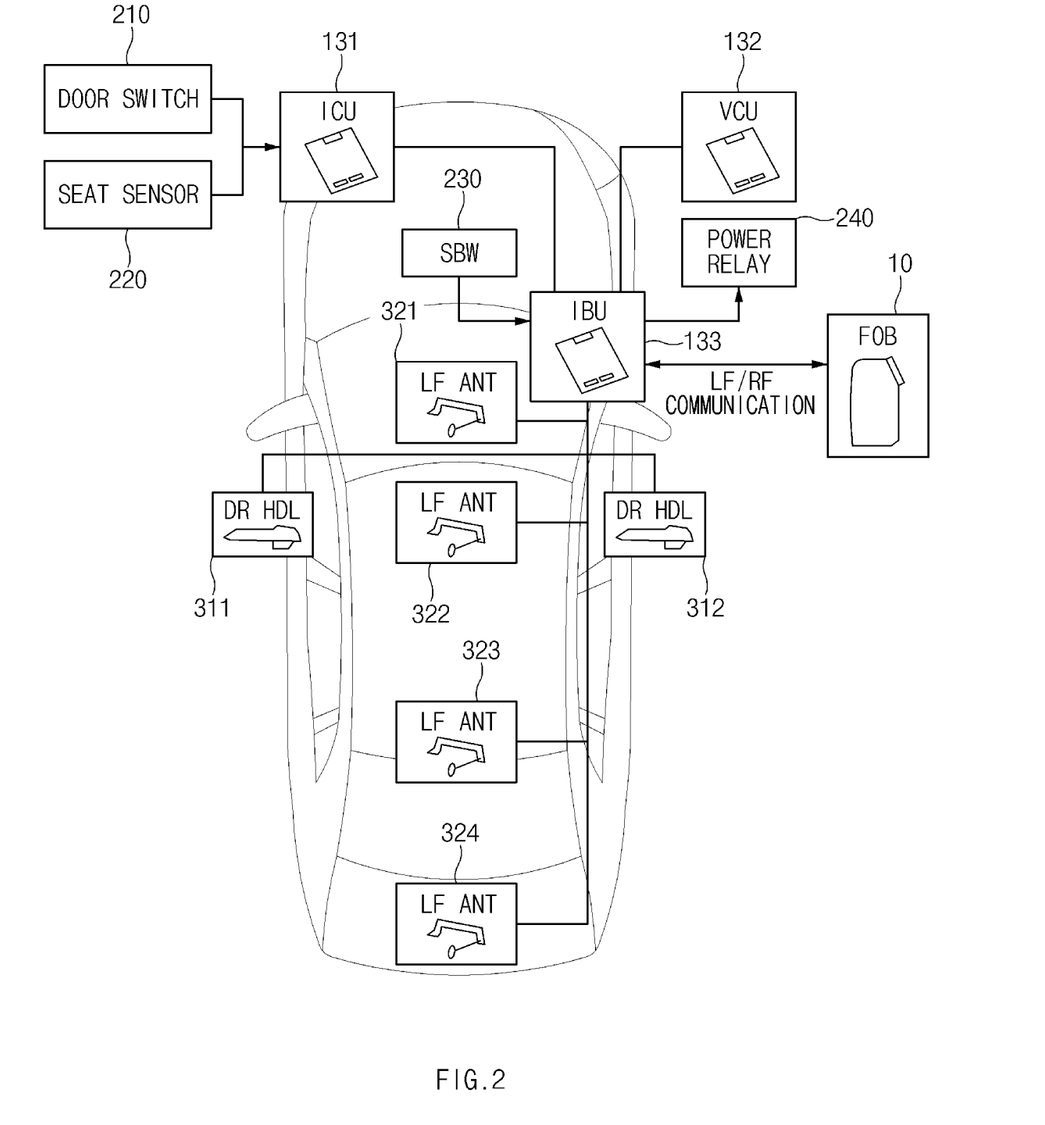
FIG. 2 is a figure illustrating an exemplary configuration of a vehicle power controller according to an embodiment of the present disclosure.

FIG. 1 is a block diagram illustrating a configuration of a vehicle system including a vehicle power controller according to an embodiment of the present disclosure. FIG. 2 is a figure illustrating an exemplary configuration of a vehicle power controller according to an embodiment of the present disclosure.

Referring to FIG. 1, the vehicle system according to an embodiment of the present disclosure may include a vehicle power controller 100, a door switch 210, a seat sensor 220, a shift-by-wire (SBW) 230, a power relay 240, a door handle antenna 310, and a low frequency antenna 320.

The vehicle power controller 100 may determine whether a user rides in a vehicle based on whether a door of the vehicle is opened or closed, or whether the user is seated in the seat, irrespective of a start button signal, and may control to switch a power source of the vehicle using at least one or more of the result of determining whether the user rides in the vehicle, or whether a brake input occurs. When the user rides in the vehicle, the vehicle power controller 100 may switch the power source of the vehicle from a power-off stage to a power-on stage. When the brake input occurs, the vehicle power controller 100 may determine that the user wants to drive the vehicle and may switch the power source of the vehicle from the power-on stage to a drivable stage. Further, whether the smart key is authenticated in the interior of the vehicle may include a result of authenticating whether the smart key which exists in the interior of the vehicle corresponds to a previously registered smart key of the user.

In an embodiment of the present disclosure, the stage of switching the power source of the vehicle may be classified as a power-off stage, a power-on stage, or a drivable stage (an EV ready stage). The stage of switching the power source of the vehicle may further include a battery+ (B+) stage. B+ is permanent power and refers to power supplied irrespective of a location of an ignition key. For example, devices which operate irrespective of a location of the ignition key, for example, the interior of the vehicle, correspond to a power condition of B+.

The power-off stage may be a state where all the power sources of the vehicle are turned off. The power-on stage may include ignition 1 (IGN1), ignition 2 (IGN2), and accessory (ACC).

IGN1 refers to a power condition necessary for starting and driving. For example, IGN1 corresponds to a power condition for operating an engine, an automatic transmission, a brake, or the like. Further, IGN2 refers to a power condition of each of auxiliary devices necessary to drive the vehicle. For example, IGN2 corresponds to a power condition of a windshield wiper, an air conditioning device, a sunroof, or the like. Further, ACC refers to a power condition of each of devices embedded for convenience of passengers. For example, ACC corresponds to a power condition of an audio, a cigar jack, or the like.

Further, the drivable stage (the EV ready stage) is a power stage for starting the vehicle and refers to the EV ready stage (a drivable state).

To this end, the vehicle power controller 100 may include a communicator 110, a storage 120, a display 130, and a processor 140.

The communicator 110 may be a hardware device implemented with various electronic circuits to transmit and receive a signal through a wireless or wired connection. In an embodiment of the present disclosure, the communicator 110 may perform inter-vehicle communication through controller area network (CAN) communication, local interconnect network (LIN) communication, Ethernet communication, or the like and may include various communication units, for example, a mobile communication unit for communication with a cloud server or the like outside the vehicle, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) unit.

The storage 120 may store information or the like for authenticating a smart key. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM) read-only memory (ROM) a programmable ROM (PROM), an electrically erasable PROM (EEPROM), a magnetic RAM (MRAM), a magnetic disk, and an optical disk.

The display 130 may be controlled by the processor 140 to output a warning message and a warning sound with respect to attempting to start the vehicle without a smart key in the interior of the vehicle. The display 130 may be implemented as a head-up display (HUD), a cluster, an audio video navigation (AVN), or the like. Further, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and/or a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected with the communicator 110, the storage 120, the display 130, or the like and may electrically control the respective components. The processor 140 may be an electrical circuit which executes instructions of software and may perform a variety of data processing and calculation described below.

The processor 140 may determine whether the user rides in the vehicle based on whether a door of the vehicle is opened or closed or whether the user is seated in the seat, and may control to switch a power source of the vehicle using at least one or more of the result of determining whether the user rides in the vehicle, or whether a brake input occurs.

When the stage of switching the power source of the vehicle is classified as a power-off stage, a power-on stage, or a drivable stage (an EV ready stage), in the power-off stage of the vehicle, when a door adjacent to the driver's seat is opened and when the smart key succeeds in being authenticated in the interior of the vehicle, or when all the doors are closed after a door except for the door adjacent to the driver's seat is opened and when the smart key succeeds in being authenticated in the interior of the vehicle, the processor 140 may switch from the power-off stage of the vehicle to the power-on stage of the vehicle.

In the power-on stage of the vehicle, the processor 140 may determine whether the state where the smart key is authenticated in the interior of the vehicle is maintained during a predetermined time.

When the state where the smart key is authenticated in the interior of the vehicle is maintained during the predetermined time in the power-on stage of the vehicle and when a brake input occurs, the processor 140 may switch the power source of the vehicle from the power-on stage of the vehicle to the drivable stage of the vehicle.

When a predetermined time elapses after the smart key succeeds in being authenticated in the interior of the vehicle in the power-on stage of the vehicle and when a brake input occurs, the processor 140 may reattempt to authenticate the smart key in the interior of the vehicle. When the authentication succeeds as a result of reattempting to authenticate the smart key in the interior of the vehicle, the processor 140 may switch the power source of the vehicle from the power-on stage of the vehicle to the drivable stage of the vehicle.

Meanwhile, when the authentication fails as a result of reattempting to authenticate the smart key in the interior of the vehicle, the processor 140 may output a warning according to an attempt to start the vehicle without the smart key. In this case, the processor 140 may output a warning sentence or a warning sound through the display 130.

When the stage of switching the power source of the vehicle is classified as a power-off stage, an ACC stage, an IGN stage, or a drivable stage (an EV ready stage), in the power-off stage of the vehicle, when the door adjacent to the driver's seat is opened and when the smart key succeeds in being authenticated in the interior of the vehicle, or when all the doors are closed after a door except for the door adjacent to the driver's seat is opened and when the smart key succeeds in authenticating the smart key in the interior of the vehicle, the processor 140 may switch the power-off stage of the vehicle to the ACC stage.

In the ACC stage, the processor 140 may determine whether the user is seated in the driver's seat. When the user is seated in the driver's seat, the processor 140 may switch from the ACC stage to the IGN stage.

In the IGN stage, when the stage where the smart key is authenticated in the interior of the vehicle is maintained during a predetermined time and when a brake input occurs, the processor 140 may switch the power source of the vehicle from the IGN stage to the drivable stage of the vehicle.

Referring to FIG. 2, the processor 140 may include an integrated control unit (ICU) 131, a vehicle control unit (VCU) 132, and an integrated body unit (IBU) 133.

The ICU 131 may be a device for controlling ignition of the vehicle, and may receive a signal from the door switch 210 and the seat sensor 220 and may transmit the received signal to the IBU 133 through body-controller area network (B-CAN) communication.

The VCU 132 may be a module for driving an actuator based on information input from various sensors of an EV and controlling to perform stable driving and may communicate with the IBU 133 through powertrain-controller area network (PT-CAN).

The IBU 133 may determine a condition where the driver rides in the vehicle and may control to switch the power source of the vehicle. In this case, the IBU 133 may determine the condition where the driver rides in the vehicle using at least one or more of a door switch input of the vehicle, a brake switch input of the vehicle, whether the smart key is authenticated in the interior of the vehicle, and/or a gear stage condition. In this case, when the stage of switching the power source of the vehicle is classified as the power-on stage, the power-off stage, or the drivable stage (the EV ready stage), the IBU 133 may sequentially switch the power-on stage, the power-off stage, and the drivable stage (the EV ready stage) depending on the condition where the driver rides in the vehicle.

Further, the IBU 133 may perform authentication through transmission and reception with the smart key 10.

The door switch 210 may detect an opening of each door of the vehicle and may provide the detected information to the vehicle power controller 100.

The seat sensor 220 may be provided in the driver's seat, and may detect that the user is seated in the driver's seat and may provide the detected information to the vehicle power controller 100.

The shift-by-wire (SBW) 230 may be an electronic transmission and may provide information about gear-stage shift to the IBU 133.

The power relay 240 may be controlled by the IBU 133 to output power (ACC, ING1, or ING2) or start power for driving.

The door handle antenna 310 may be a smart key antenna and may be provided in each of left and right door handles 311 and 312 of the vehicle shown in FIG. 2.

The low frequency antenna 320 may be a smart key antenna and may include at least one or more low frequency antennas 322 to 324.

The smart key 10 may perform low frequency/radio frequency (LF/RF) communication with the IBU 133 and may transmit and receive authentication information.

As such, an embodiment of the present disclosure may control to switch the power source of the vehicle using at least one or more of a condition where the user rides in the vehicle, or whether a brake input occurs, in the vehicle which does not have a start button, thus increasing convenience of the user and resulting in saved costs.

Figure 3:
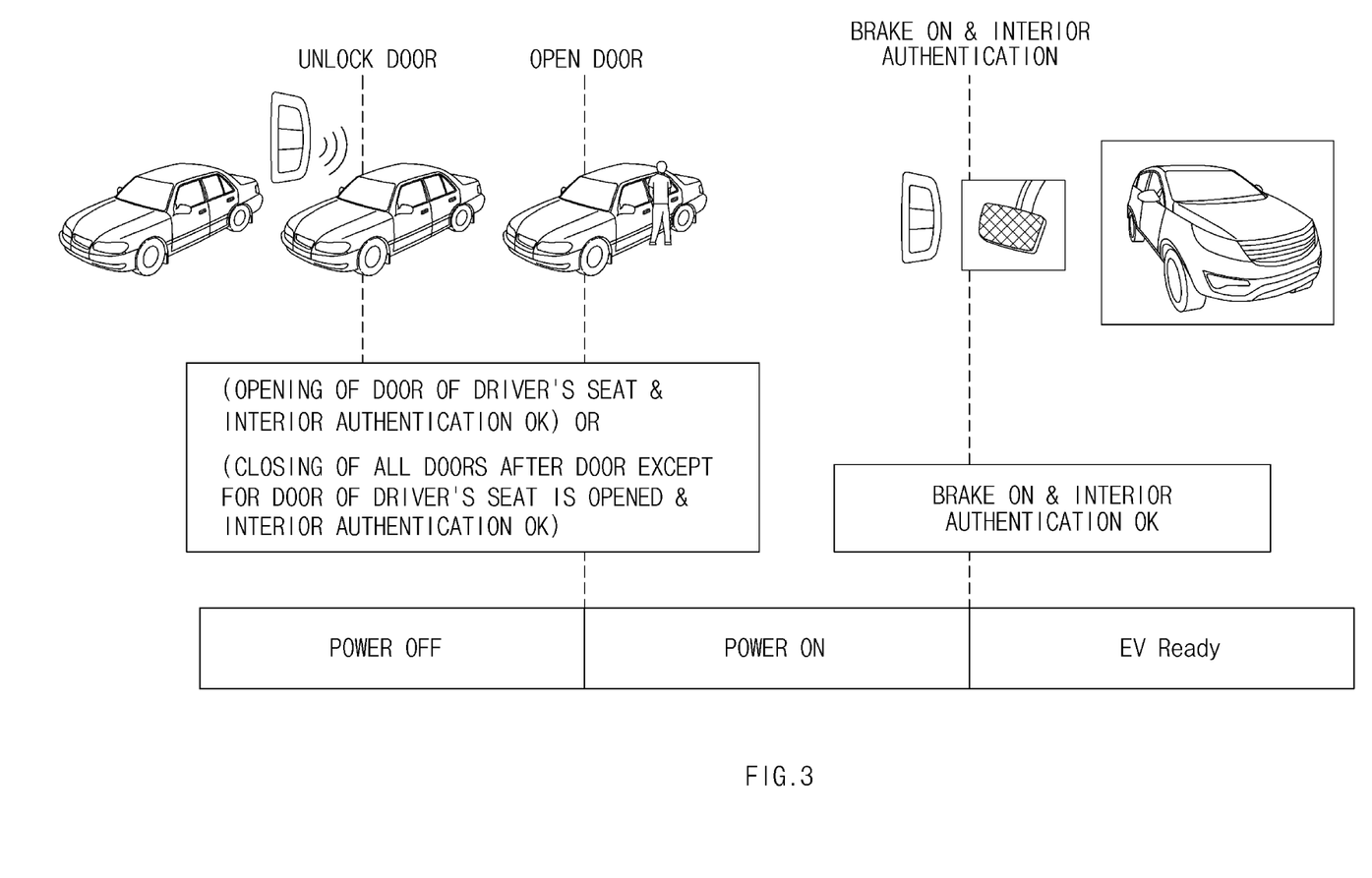
FIG. 3 is a figure illustrating power transition control according to a condition where a driver rides in a vehicle in a vehicle power controller according to an embodiment of the present disclosure.

FIG. 3 is a figure illustrating power transition control according to a condition where a driver rides in a vehicle in a vehicle power controller according to an embodiment of the present disclosure.

In FIG. 3, an embodiment is exemplified as a power source of a vehicle switches from a power-off stage to a power-on stage and switches from the power-on stage to an EV ready stage (a drivable state).

First of all, when a door adjacent to the driver's seat is opened and when a smart key succeeds in being authenticated in the interior of the vehicle, or when all the doors are closed after a door except for the door adjacent to the driver's seat is opened and when the smart key succeeds in being authenticated in the interior of the vehicle, a vehicle power controller 100 of FIG. 1 may switch the power source of the vehicle from the power-off stage to the power-on stage. In other words, when a user is seated in the driver's seat and succeeds in authenticating the smart key in the interior of the vehicle, or when the user is seated in the seat except for the driver's seat and succeeds in authenticating the smart key in the interior of the vehicle, the vehicle power controller 100 may switch the power source of the vehicle to the power-on stage.

When a brake input occurs in the state where the smart key is authenticated in the interior of the vehicle, the vehicle power controller 100 may switch the power source of the vehicle from the power-on stage to the EV ready stage. Further, when the smart key is not authenticated in the interior of the vehicle or when a brake input occurs in a state where 30 seconds elapses after the smart key is authenticated, the vehicle power controller 100 may attempt to authenticate the smart key again in the interior of the vehicle. When the smart key succeeds in being authenticated in the interior of the vehicle, the vehicle power controller 100 may switch the power source of the vehicle from the power-on stage and the EV ready stage.

Meanwhile, when a brake input occurs in the power-off state, the vehicle power controller 100 may attempt to authenticate the smart key again in the interior of the vehicle. When the smart key succeeds in being authenticated in the interior of the vehicle, the vehicle power controller 100 may omit the power-on stage to immediately switch from the power-off stage to the EV ready stage.

Figure 4:
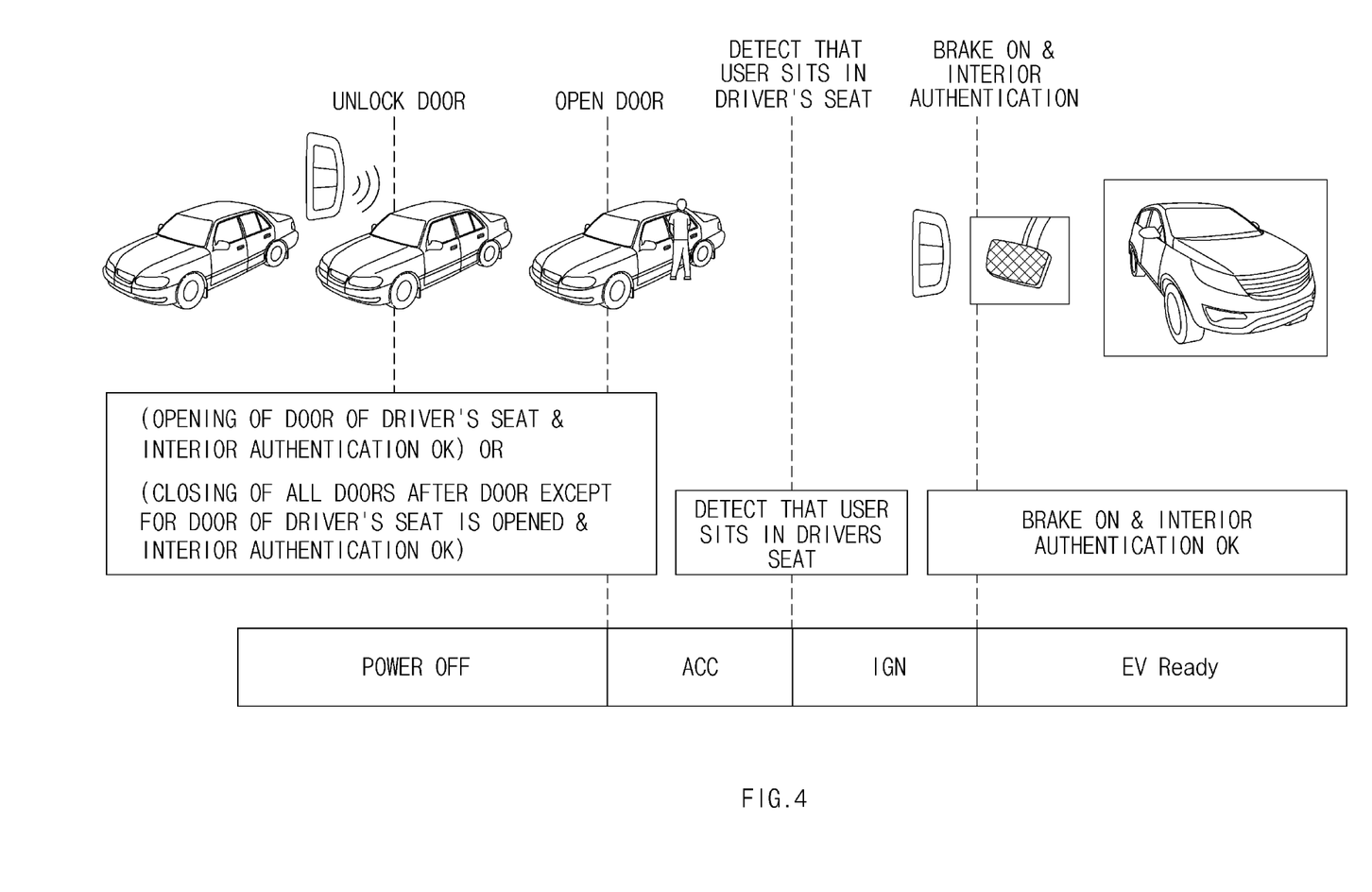
FIG. 4 is a figure illustrating power transition control according to a sensing condition where a driver is seated in the driver's seat in a vehicle power controller according to an embodiment of the present disclosure.

FIG. 4 is a figure illustrating power transition control according to a sensing condition where a driver is seated in the driver's seat in a vehicle power controller according to an embodiment of the present disclosure.

In FIG. 4, an embodiment is exemplified as a power source of a vehicle switches from a power-off stage to an ACC stage, switches from the ACC stage to an IGN stage, and switches from the IGN stage to an EV ready stage (a drivable state).

In this case, the ACC stage refers to a power condition of each of devices embedded for convenience of passengers. For example, ACC corresponds to a power condition of an audio, a cigar jack, or the like. Further, IGN refers to a power condition for starting the vehicle. The IGN stage refers to a power condition necessary for starting and driving or a power condition of each of auxiliary devices (e.g., an air conditioning device and the like) necessary to drive a vehicle.

Referring to FIG. 4, first of all, when a door adjacent to the driver's seat is opened and when a smart key succeeds in being authenticated in the interior of the vehicle, or when all the doors are closed after a door except for the door adjacent to the driver's seat is opened and when the smart key succeeds in being authenticated in the interior of the vehicle, a vehicle power controller 100 of FIG. 1 may switch the power source of the vehicle from the power-off stage to the power-on stage.

When the power source of the vehicle is ACC, the vehicle power controller 100 may detect whether a user is seated in the driver's seat. When the user is seated in the driver's seat. The vehicle power controller 100 may switch the power source of the vehicle from the ACC stage to the IGN stage. In this case, when the user does not sit in the driver's seat, the vehicle power controller 100 may maintain the ACC stage. In other words, the vehicle power controller 100 may determine whether the user is seated in the driver's seat and, when a door is opened and then when the user is seated in the driver's seat, may switch the power source of the vehicle to the IGN stage to use an air conditioning device or the like.

When a brake input occurs in the state where the smart key is authenticated In the interior of the vehicle, the vehicle power controller 100 may switch the power source of the vehicle from the power-on stage to the EV ready stage.

Figure 5:
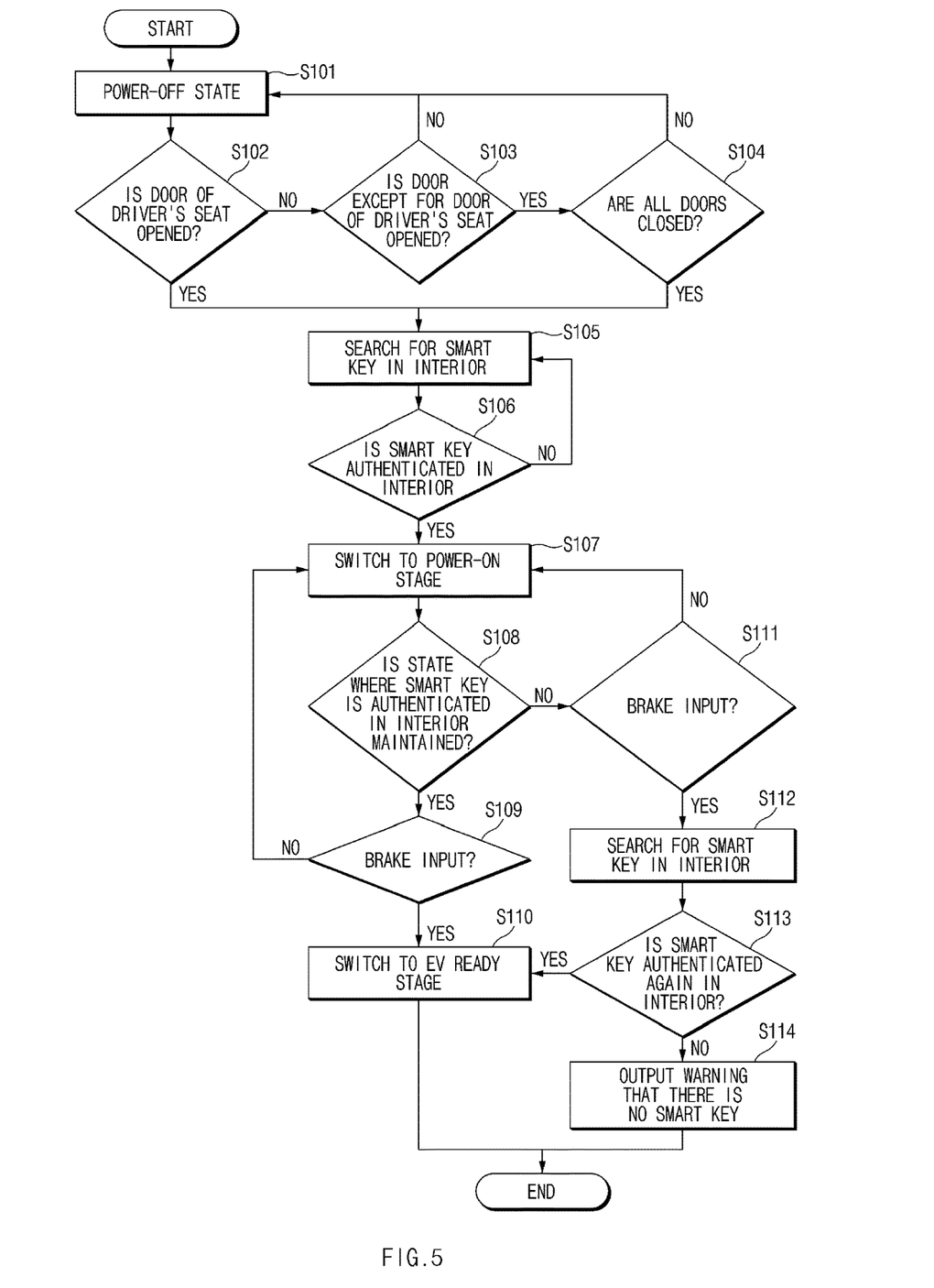
FIG. 5 is a flowchart illustrating a vehicle power control method according to an embodiment of the present disclosure.

Hereinafter, a description will be given in detail of a vehicle power control method according to an embodiment of the present disclosure with reference to FIG. 5. FIG. 5 is a flowchart illustrating a vehicle power control method according to an embodiment of the present disclosure.

Hereinafter, it is assumed that a vehicle power controller 100 of FIG. 1 performs a process of FIG. 5. Further, in a description of FIG. 5, an operation described as being performed by an apparatus may be understood as being controlled by a processor 140 of the vehicle power controller 100.

Referring to FIG. 5, a power source of a vehicle may sequentially switch to a power-off stage, a power-on stage, and a drivable stage (an EV ready stage). The power-off stage refers to a state where all the power sources of the vehicle are turned off. The power-on stage refers to a state where a power source of the vehicle is turned on. The drivable stage is a start stage and refers to a state where it is able for the vehicle to drive.

First of all, the apparatus may determine whether a door adjacent to the driver's seat is opened in a power-off state (S101) and whether a door except for the door adjacent to the driver's seat is opened. In other words, in S102, the apparatus may determine whether the door adjacent to the driver's seat is opened in the power-off state (S101). When the door adjacent to the driver's seat is not opened, in S103, the apparatus may determine whether the door except for the door adjacent to the driver's seat is opened. When the door except for the door adjacent to the driver's seat is opened, in S104, the apparatus may determine whether all the doors are closed. In this case, the apparatus may determine whether the door is opened or closed using a door switch installed for each door of the vehicle.

When the door adjacent to the driver's seat is opened in S102, or when all the doors are closed in S104 after the door except for the door adjacent to the driver's seat is opened, in S105, the apparatus may search whether there is a smart key (a fob key) in the interior of the vehicle. When there is the smart key in the interior of the vehicle, in S106, the apparatus may communicate with the smart key and may authenticate the smart key. In this case, the apparatus may communicate with the smart key at a predetermined period and may check a state where the authentication is maintained. In this case, the authentication of the smart key may be performed by transmitting and receiving authentication information through communication between the apparatus and the smart key. The apparatus may compare previously stored authentication information with authentication information received from the smart key to determine a success or failure in authenticating the smart key.

When the smart key of the vehicle succeeds in being authenticated in the interior of the vehicle, in S107, the apparatus may switch a power source of the vehicle to a power-on stage. In S108, the apparatus may continue checking whether the state where the smart key is authenticated in the interior of the vehicle is maintained. When the state where the smart key is authenticated in the interior of the vehicle is kept continuous, in S109, the apparatus may determine whether a brake input occurs. The apparatus may receive a signal from a brake of the vehicle to determine whether a driver brakes.

When the brake input occurs in the state where the authenticated state of the smart key in the interior of the vehicle is kept continuous, in S110, the apparatus may switch the power source of the vehicle from the power-on stage to the EV ready stage (a drivable stage). In this case, the EV ready stage is a stage ready to drive after starting an EV and refers to a drivable state of the EV. Because the state where the smart key is authenticated in the interior of the vehicle is maintained during a predetermined time (e.g., 30 seconds) after authenticating the smart key, when a brake input occurs within the predetermined time after authenticating the smart key of the vehicle in the interior of the vehicle, the apparatus may switch the power source of the vehicle from the power-on stage to the EV ready stage.

When the state where the smart key is authenticated in the interior of the vehicle is not kept continuous in S108, in S111, the apparatus may determine whether a brake input occurs. When the brake input occurs, in S112, the apparatus may search whether there is the smart key in the interior of the vehicle again. In other words, when the predetermined time elapses after authenticating the smart key of the vehicle in the interior of the vehicle or when the smart key is not authenticated in the interior of the vehicle, and when a brake input occurs, the apparatus may re-search for the smart key in the interior of the vehicle.

When the smart key is found in the interior of the vehicle, in S113, the apparatus may communicate with the smart key in the interior of the vehicle and may authenticate the smart key again.

When the smart key succeeds in being authenticated again, in S110, the apparatus may switch the power source of the vehicle from the power-on stage to the EV ready stage. On the other hand, when the smart key fails in being authenticated again, in S114, the apparatus may warn the user that it is attempted to start the vehicle in the state where there is no smart key. In this case, the apparatus may output a warning sentence or a warning sound for warning the user that it is attempted to start the vehicle without the smart key, using a display 130 of FIG. 1, or may transmit a text message to a previously registered mobile terminal of a driver.

As such, an embodiment of the prevent disclosure may determine a condition where the user rides in the vehicle and a driving start time without using a start button for power transition manipulation of the vehicle and may perform control to switch the power source of the vehicle, thus reducing the number of unnecessary manipulation devices of the vehicle and resulting in saved costs.

Further, an embodiment of the present disclosure may perform starting control without separate manipulation of the user, thus increasing convenience of the user.

Figure 6:
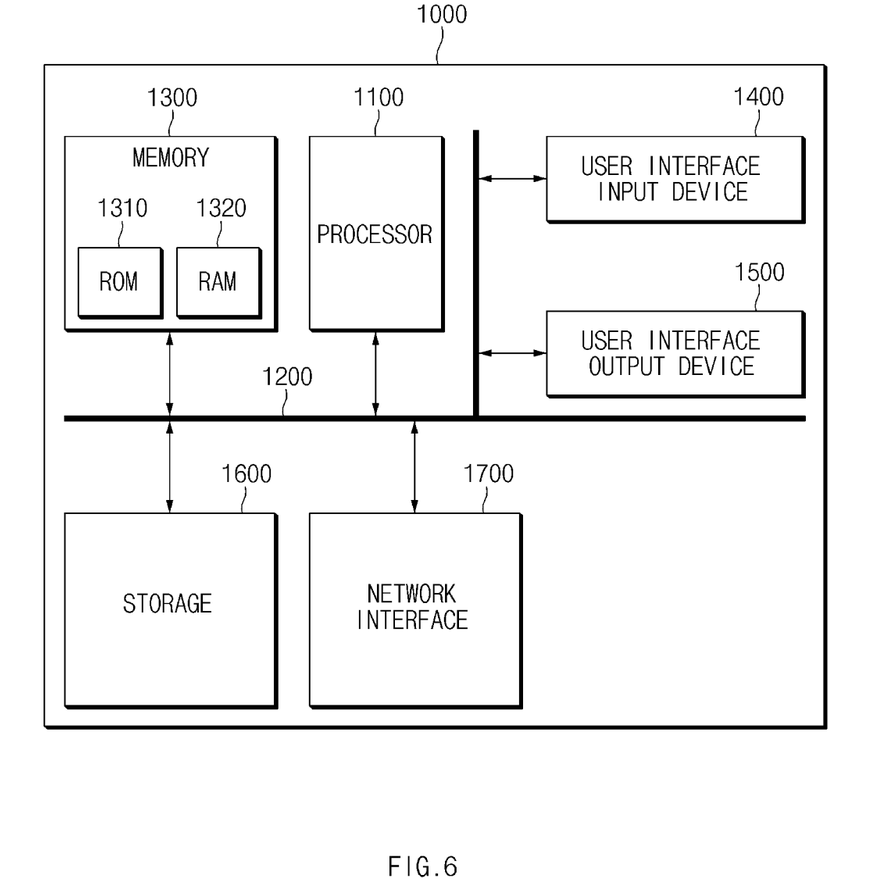
FIG. 6 is a block diagram illustrating a computing system according to an embodiment of the present disclosure.

FIG. 6 is a block diagram illustrating a computing system according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may determine a condition where a driver rides in the vehicle and a driving start time and may control to switch a power source of the vehicle, without a start button for power transition manipulation of the vehicle, to reduce the number of unnecessary manipulation devices of the vehicle and may perform starting control without separate manipulation of the user to increase convenience of the user.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle power controller for switching a power source of a vehicle, the vehicle power controller comprising:
 a processor configured to switch the power source of the vehicle based on whether a user rides in the vehicle, or whether a brake input occurs, without a start button for start of the vehicle; and
 a storage storing information for authenticating a smart key in an interior of the vehicle,
 wherein the processor is configured to:
 determine whether the user rides in the vehicle based on whether the smart key is authenticated in the interior of the vehicle, whether a door of the vehicle is opened or closed, or whether the user is seated in a seat of the vehicle, and
 wherein the processor is configured to:
 switch from the power-off stage of the vehicle to an accessory (ACC) stage, when a door adjacent to the driver's seat is opened and when the smart key is authenticated in the interior of the vehicle, or when all the doors are closed after a door except for the door adjacent to the driver's seat is opened and the smart key is authenticated in the interior of the vehicle, in a power-off stage of the vehicle, determine whether the user is seated in the driver's seat in the ACC stage and switches from the ACC stage to an ignition (IGN) stage when the user is seated in the driver's seat.

2. The vehicle power controller of claim 1, wherein the processor switches from a power-off stage of the vehicle to a power-on stage of the vehicle when a door adjacent to the driver's seat is opened and when the smart key succeeds in being authenticated in the interior of the vehicle, or when all the doors are closed after a door except for the door adjacent to the driver's seat is opened and when the smart key succeeds in being authenticated in the interior of the vehicle, in a power-off stage of the vehicle.

3. The vehicle power controller of claim 2, wherein the processor determines whether a state where the smart key is authenticated in the interior of the vehicle is maintained during a predetermined time in the power-on stage of the vehicle.

4. The vehicle power controller of claim 3, wherein the processor switches the power source of the vehicle from the power-on stage of the vehicle to a drivable stage of the vehicle, when the stage where the smart key is authenticated in the interior of the vehicle is maintained during the predetermined time in the power-on stage of the vehicle and when the brake input occurs.

5. The vehicle power controller of claim 3, wherein the processor reattempts to authenticate the smart key in the interior of the vehicle, when a predetermined time elapses after the smart key succeeds in being authenticated in the interior of the vehicle in the power-on stage of the vehicle and when the brake input occurs.

6. The vehicle power controller of claim 5, wherein the processor switches the power source of the vehicle from the power-on stage of the vehicle to a drivable stage of the vehicle, when the authentication succeeds as a result of reattempting to authenticate the smart key in the interior of the vehicle.

7. The vehicle power controller of claim 5, wherein the processor outputs a warning according to an attempt to start the vehicle without the smart key, when the authentication fails as a result of reattempting to authenticate the smart key in the interior of the vehicle.

8. The vehicle power controller of claim 1, wherein the processor switches the power source of the vehicle from the IGN stage to a drivable stage of the vehicle, when a state where the smart key is authenticated in the interior of the vehicle is maintained during a predetermined time and when the brake input occurs, in the IGN stage.

9. A vehicle system, comprising:
a smart key configured to communicate with a vehicle; and
a vehicle power controller configured to communicate with the smart key and switch the power source of the vehicle based on whether a user rides in the vehicle, or whether a brake input occurs, without a start button for start of the vehicle,
wherein the vehicle power controller is configured to:
determine whether the user rides in the vehicle based on whether a smart key is authenticated in an interior of the vehicle, whether a door adjacent to the vehicle is opened or closed, or whether the user is seated in the seat, and
wherein the vehicle power controller is configured to:
switch from the power-off stage of the vehicle to an accessory (ACC) stage, when a door adjacent to the driver's seat is opened and when the smart key is authenticated in the interior of the vehicle, or when all the doors are closed after a door except for the door adjacent to the driver's seat is opened and the smart key is authenticated in the interior of the vehicle, in a power-off stage of the vehicle,
determine whether the user is seated in the driver's seat in the ACC stage and switches from the ACC stage to an ignition (IGN) stage when the user is seated in the driver's seat.

10. The vehicle system of claim 9, further comprising:
a door switch configured to be turned on or off according to whether a door adjacent to the vehicle is opened or closed; and
a seat sensor configured to sense that the user is seated in the seat of the vehicle.

11. A vehicle power control method, comprising:
determining whether a user rides in a vehicle based on whether a door of the vehicle is opened or closed, or whether the user is seated in the seat;
authenticating a smart key which exists in an interior of the vehicle; and
switching a power source of the vehicle based on whether the user rides in the vehicle, or whether a brake input occurs, without a start button for start of the vehicle,
wherein switching the power source of the vehicle includes:
switching from the power-off stage of the vehicle to an accessory (ACC) stage, when a door adjacent to the driver's seat is opened and when the smart key is authenticated in the interior of the vehicle, or when all the doors are closed after a door except for the door adjacent to the driver's seat is opened and the smart key is authenticated in the interior of the vehicle, in a power-off stage of the vehicle,
determining whether the user is seated in the driver's seat in the ACC stage and switches from the ACC stage to an ignition (IGN) stage when the user is seated in the driver's seat.

12. The vehicle power control method of claim 11, wherein determining whether the user rides in the vehicle includes:
determining that the user rides in the vehicle when a door adjacent to a driver's seat is opened and when the smart key succeeds in being authenticated in the interior of the vehicle, or when all the doors are closed after a door except for the door adjacent to the driver's seat is opened and when the smart key succeeds in being authenticated in the interior of the vehicle, in a power-off stage of the vehicle.

13. The vehicle power control method of claim 12, wherein switching the power source of the vehicle includes:
switching from the power-off stage of the vehicle to a power-on stage of the vehicle, when it is determined that the user rides in the vehicle.

14. The vehicle power control method of claim 13, wherein switching the power source of the vehicle includes:
determining whether a state where the smart key is authenticated in the interior of the vehicle is maintained during a predetermined time in the power-on stage of the vehicle.

15. The vehicle power control method of claim 14, wherein switching the power source of the vehicle further includes:
switching the power source of the vehicle from the power-on stage of the vehicle to a drivable stage of the vehicle when the state where the smart key is authenticated in the interior of the vehicle is maintained during the predetermined time in the power-on stage of the vehicle and when the brake input occurs.

16. The vehicle power control method of claim 14, wherein switching the power source of the vehicle further includes:

reattempting to authenticate the smart key in the interior of the vehicle when a predetermined time elapses after the smart key succeeds in being authenticated in the interior of the vehicle in the power-on stage of the vehicle and when the brake input occurs; and switching the power source of the vehicle from the power-on stage of the vehicle to a drivable stage of the vehicle when the authentication succeeds as a result of reattempting to authenticate the smart key in the interior of the vehicle.

17. The vehicle power control method of claim 16, wherein switching the power source of the vehicle further includes:

outputting a warning according to an attempt to start the vehicle without the smart key, when the authentication fails as a result of reattempting to authenticate the smart key in the interior of the vehicle.

\* \* \* \* \*